United States Patent [19]

Ingraham

[11] Patent Number: 6,000,884
[45] Date of Patent: Dec. 14, 1999

[54] APPARATUS FOR CONTROLLING FLOW IN AIR CONVEYOR SYSTEMS

[75] Inventor: Thomas M. Ingraham, Fort Collins, Colo.

[73] Assignee: Advanced Manufacturing Technology, Fort Collins, Colo.

[21] Appl. No.: 08/826,157

[22] Filed: Mar. 27, 1997

[51] Int. Cl.$^6$ .................................................. B65G 51/16
[52] U.S. Cl. ................................ 406/19; 198/340; 406/93
[58] Field of Search ................................. 406/11, 14, 19, 406/87, 88, 93, 94, 95; 198/340, 341

[56] References Cited

U.S. PATENT DOCUMENTS

| | | | |
|---|---|---|---|
| 4,515,503 | 5/1985 | Snowdon | 406/11 |
| 4,715,748 | 12/1987 | Krambrock | 406/14 X |
| 5,220,840 | 6/1993 | Ingraham et al. | |
| 5,407,305 | 4/1995 | Wallace | 406/14 |

*Primary Examiner*—William E. Terrell
*Assistant Examiner*—Gene O. Crawford
*Attorney, Agent, or Firm*—Harness, Dickey & Pierce, P.L.C.

[57] ABSTRACT

An air conveyor system has a blower in communication with a plenum. The blower provides air to the plenum to move the objects with respect to the plenum. The air conveyor system includes a plurality of dampers disposed at predetermined locations along the plenum with the dampers being normally open. A sensor device senses the location where the objects have accumulated with respect to the plenum. Furthermore, the air conveyor system includes a closing device for closing the damper which is at the location where the objects have accumulated with respect to the plenum. The closing of the damper is based upon the sensed accumulated location. The system includes a variable speed blower for providing air to move objects with respect to the plenum. The objects are either in an accumulated or unaccumulated state with respect to the plenum. A velocity measuring device measures the velocity of the objects, and an adjustment device which is connected to the velocity measuring device adjusts the speed of the blower to a predetermined speed based upon the velocity of the unaccumulated objects.

14 Claims, 11 Drawing Sheets

_Fig-13_

_Fig-14_

_Fig-15_

PRODUCT FLOW

APPARATUS FOR CONTROLLING FLOW IN AIR CONVEYOR SYSTEMS

BACKGROUND OF THE INVENTION

1. Field of the Invention

The present invention relates generally to air conveyor systems and more particularly to flow control in air conveyor systems.

2. Description of the Prior Art

In general, air conveyance systems are accumulators where the conveyor fills with product and then empties out. Common applications of air conveyor systems include handling two piece aluminum cans and blow molded plastic bottles.

An air conveyance system provides motive force to the product being conveyed through momentum transfer from an air jet to the product. When the system is full of product, the air pressure must be set high enough to clear out the entire weight of all the product present. When the system is empty and single items are moving through the system, there is a tendency for the single objects to move too fast and either become damaged or jammed. The difference between accumulated and unaccumulated flow may be analogized to the difference between bumper-to-bumper rush hour traffic and single cars moving at the speed they choose.

Figure 1:
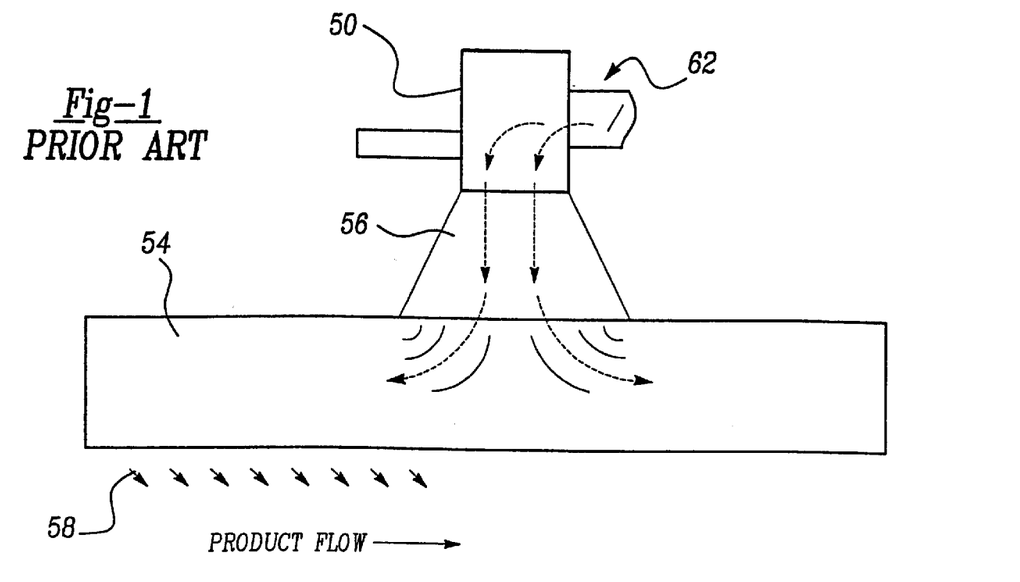
FIG. 1 is a schematic showing a first conventional air conveyor system.

A conventional two pressure design is shown in FIG. 1. In this design, a blower 50 pressurizes a plenum 54 which supplies air 56 to the jets 58 which impart momentum to the product. When the sensor tells the control system that the subject fan zone has become accumulated (i.e., backed up), then the automatic damper 62 opens, supplying more air 56 into the plenum 54. Inlet dampers, outlet dampers, and variable speed drives which change the motor's revolutions per minute (RPM) have been used as methods for changing plenum pressure.

Figure 2:
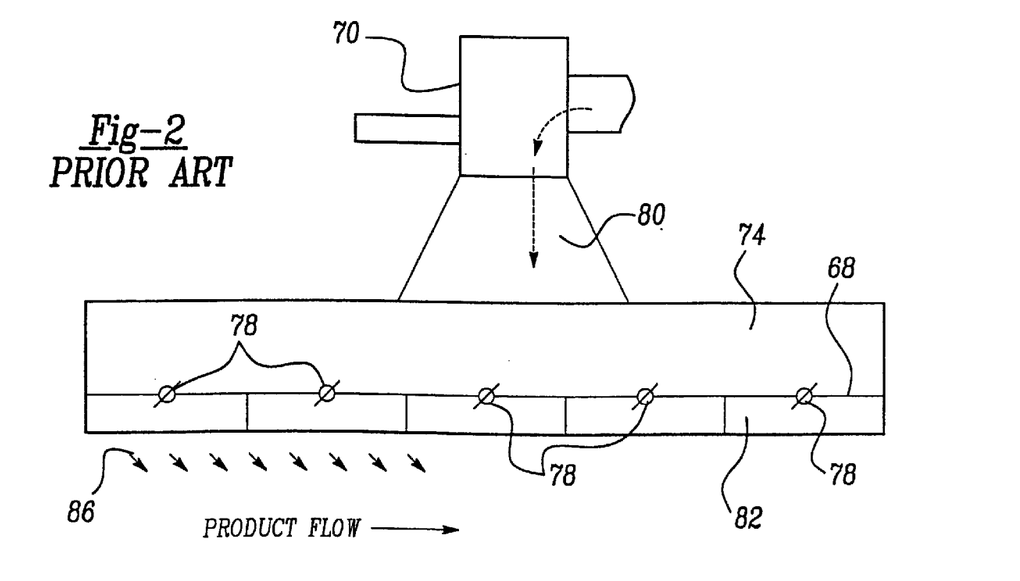
FIG. 2 is a schematic showing a second conventional air conveyor system wherein the plenum is split.

A second conventional two pressure design is shown in FIG. 2. In this design the plenum is split by a divider 68. A blower 70 pressurizes the primary plenum 74, and multiple dampers 78 in parallel regulate the flow of air 80 into the secondary plenum 82. Louvers which form the air jets 86 that drive the product are connected to the secondary plenum 82. U.S. Pat. No. 5,222,840 is representative of this type of conventional design.

A disadvantage with the first approach is that the length of the control zone is the same as the blower zone. Once the control zone becomes too long then the advantage of the two pressure system is lost. The sensor which switches the zone to high pressure must be located so far from the upstream end of the zone that the product has a chance to gain terminal speed before hitting the back end of the accumulated pack—thereby causing damage to the product and to the pack.

Moreover, the use of smaller blowers and a shorter blower zone in order to shorten the control zone increases both the cost of the equipment and the cost to install it. Lastly, a disadvantage with the second approach is the sheet metal fabrication cost to divide the two plenums.

SUMMARY OF THE INVENTION

The present invention is an air conveyor system which has a blower in communication with a plenum. The blower provides air to the plenum to move the objects within the plenum. The present invention includes a plurality of dampers disposed at predetermined locations along the plenum with the dampers being normally open. A sensor device senses the location where the objects have accumulated within the plenum. Furthermore, the present invention includes a closing device for closing the damper which is at the location where the objects have accumulated with respect to the plenum. The closing of the damper is based upon the sensed accumulated location.

The present invention also includes a system for moving objects with respect to a plenum that includes a variable speed blower for providing air to move objects with respect to the plenum. The objects are either in an accumulated or unaccumulated state with respect to the plenum. A velocity measuring device measures the velocity of the objects, and an adjustment device which is connected to the velocity measuring device adjusts the speed of the blower to a predetermined speed based upon the velocity of the unaccumulated objects. A velocity measuring device uses the two pressure system with short control zones.

BRIEF DESCRIPTION OF THE DRAWINGS

Additional advantages and features of the present invention will become apparent from the subsequent description and the appended claims, taken in conjunction with the accompanying drawings, in which:

DESCRIPTION OF THE PREFERRED EMBODIMENTS

Figure 3:
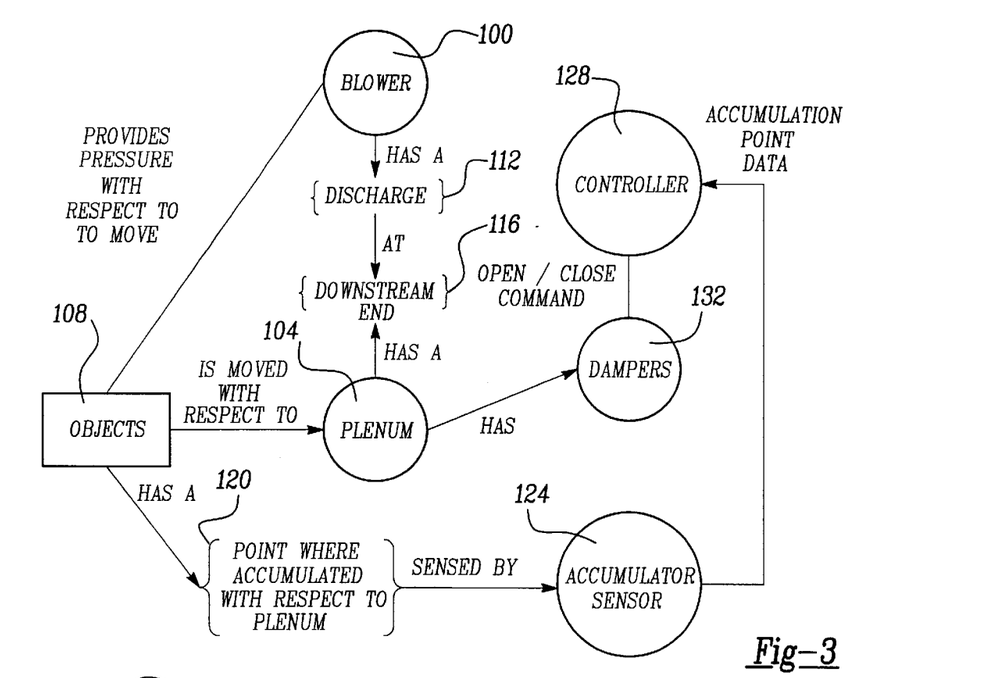
FIG. 3 is an entity relationship diagram showing the interrelationships regarding the control of the dampers.
Figure 10:
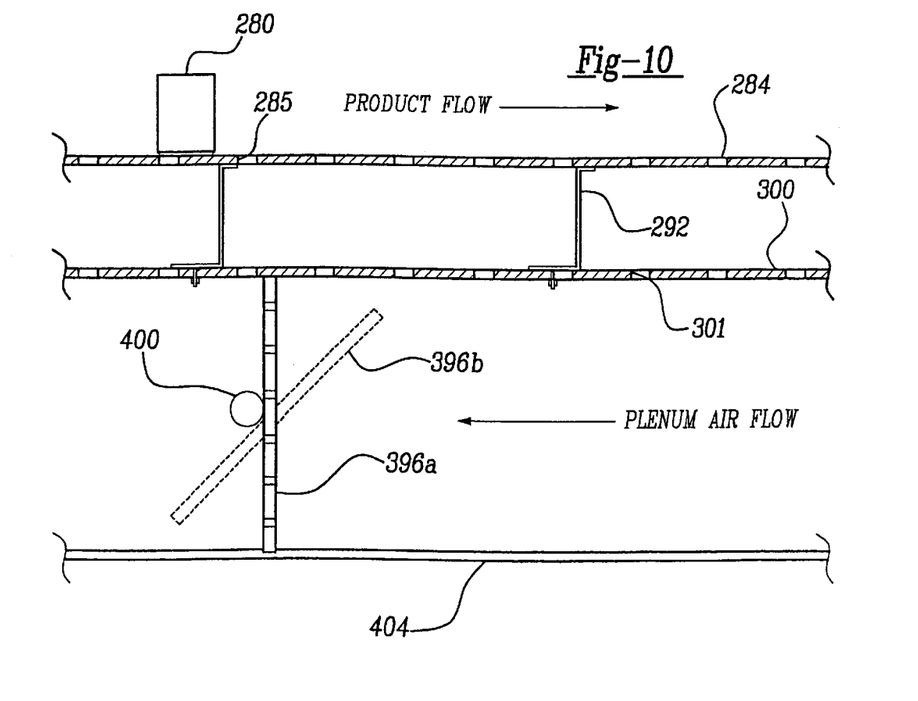
FIG. 10 is a schematic view showing a sequencing damper within the air conveyor system.
Figure 24:
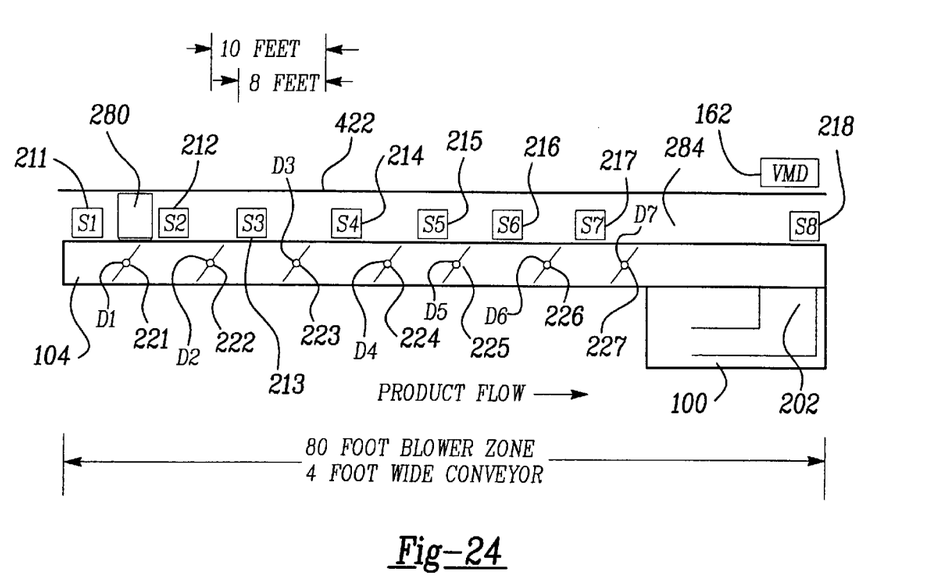
FIG. 24 is a schematic view showing the zone sensor arrangement for the air conveyor system.

Referring to FIG. 3, the present invention includes a blower 100 which provides pressure within a plenum 104 to move objects 108. The blower 100 has a discharge 112 at the downstream end 116 of the plenum 104. The objects 108 have a point 120 where the objects have accumulated on the plenum 104. The point 120 is sensed by an accumulator sensor 124 which provides accumulation point data to a controller 128. Controller 128 issues open and close commands to dampers 132 which are situated within plenum 104. The controller 128 issues commands based upon the accumulation point data. FIGS. 24 and 10, which are discussed below, show the physical structure of FIG. 3.

Figure 4:
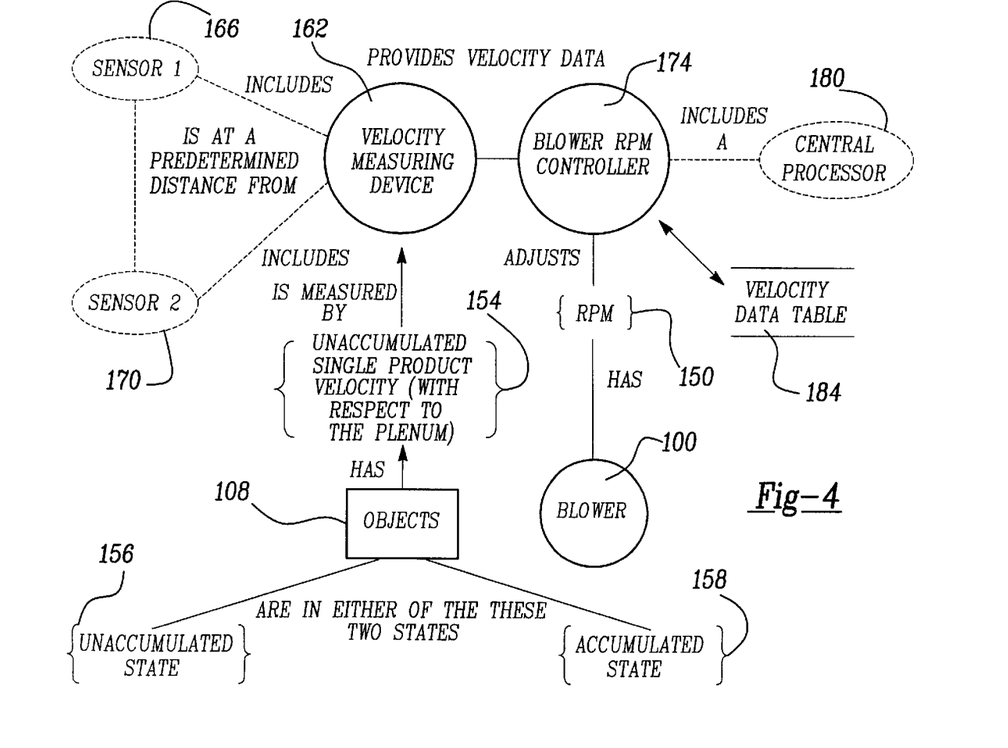
FIG. 4 is an entity relationship diagram showing the interrelationships of the control for the speed of a blower.

Referring to FIG. 4, the RPM 150 of blower 100 is controlled based upon the unaccumulated single product velocity 154 (i.e., while objects are in the unaccumulated state 156 with respect to the plenum). If this velocity drops too low, then the objects 108 "bunch up" and "stall out." If this velocity is too high, then damage to the objects 108 and increased jamming occurs. In the accumulated state 158, when the objects 108 are backed up with respect to the plenum, the pressure settings are typically much less critical.

The present invention measures the unaccumulated single product velocity 154 through a Velocity Measurement Device (VMD 162) and adjusts the RPM 150 of the blower 100 to control the unaccumulated single product velocity 154 at the desired level. The economics of the VMD 162 and the blower Variable Speed Drive usually require a long blower zone and fewer number of blowers to make the system cost effective. In addition, a two pressure system assists to control the unaccumulated single product velocity 154 without a serious concern for recovery from accumulation.

The following equations illustrate the relationship between the unaccumulated single product velocity and accumulation efficiency. For a single lane system, the relationship is as follows:

$$\frac{12''}{\text{Container Diameter (inches)}} = \text{Containers PerFootAccumulated}$$

$$\frac{\text{Rate}}{\text{Single Container Speed}} = \text{ContainersPerFtUnaccumulated}$$

where Rate is expressed as Containers Per Minute and Single Container Speed is expressed as Feet Per Minute.

$$\text{Efficiency} = \frac{\text{Containers Per Ft Accumulated} - \text{Containers Per Ft Unaccumulated}}{\text{Containers Per Ft Accumulated}}$$

With respect to mass flow, the following equations apply:

$$\left[\frac{12''}{\text{ContainerDiameter (inches)}}\right]\left[\frac{12''}{\text{ContainerDiameter (inches)}}\right] = \text{ContainersPerSquareFootAccumulated}$$

$$\frac{\text{Rate}}{\text{Single Container Speed}} = \text{ContainersPerFtUnaccumulated}$$

$$\text{Efficiency} = \frac{\text{Containers Per Ft Accumulated} - \text{Containers Per Ft Unaccumulated}}{\text{Containers Per Ft Accumulated}}$$

For the preferred embodiment, the VMD 162 operates by placing two sensors at a known distance from each other and measuring the time delay between the product reaching the first sensor 166 and the second sensor 170. Once this value is measured, the control system 174 checks that the system is, in fact, unaccumulated. If the system is unaccumulated, then this velocity value is sent to the control system which for the preferred embodiment is a central processor 180. This velocity value is typically imprecise because of the nature of air conveyors in general.

For this reason, the central processor 180 stores the measured velocities over a period of time in data store 184 and performs a series of statistical functions including ignoring certain data that is invalid and finding a central tendency such as a mean or median. In the preferred embodiment since the conditions vary over a period of hours and the measurement can be done at a rate of hundreds of points per minute, large samples are taken before any adjustment of the output is required. With large samples, the power of statistical manipulation provides highly precise measurements of the actual conditions on the conveyor.

For the preferred embodiment, the statistical processing by the central processor 180 includes: calculating the mean; disregarding all points which are outside of two standard deviations from the mean; recalculating the mean; subjecting the mean value to a null hypothesis where the mean is the same value as the previous calculations. If there is a ninety percent probability that they are different, then the difference is calculated. The difference is multiplied by an RPM factor (which is empirically determined) in order to get the RPM difference. The blower RPM is changed by this calculated value. Depending on the application, sample sizes vary, but typically they can be rather large in the order of 1,000.

Additionally, for the RPM changes, the following equation is also used in the preferred embodiment:

$$Q = K\sqrt{P}$$

Where Q is flow in cubic feet per minute; P is pressure in inches water column and K is a constant which converts units and accounts for open area and takes into account the flow coefficient for the orifice itself;

$$P_2 = \left(P_1\left(\frac{RPM_2}{RPM_1}\right)\right)^2$$

$$Q_2 = Q_1\left(\frac{RPM_2}{RPM_1}\right)$$

$$HP_2 = \left(HP_1\left(\frac{RPM_2}{RPM_1}\right)\right)^3$$

Which follows since HP α PxQ $$Q_1 = K\sqrt{P_1} \text{ and } Q_2 = K\sqrt{P_2}$$

$$Q_2 = K\sqrt{P_1\left(\frac{RPM_2}{RPM_1}\right)^2}$$

$$Q_2 = K\sqrt{P}\left(\frac{RPM_2}{RPM_1}\right)$$

Figure 5:
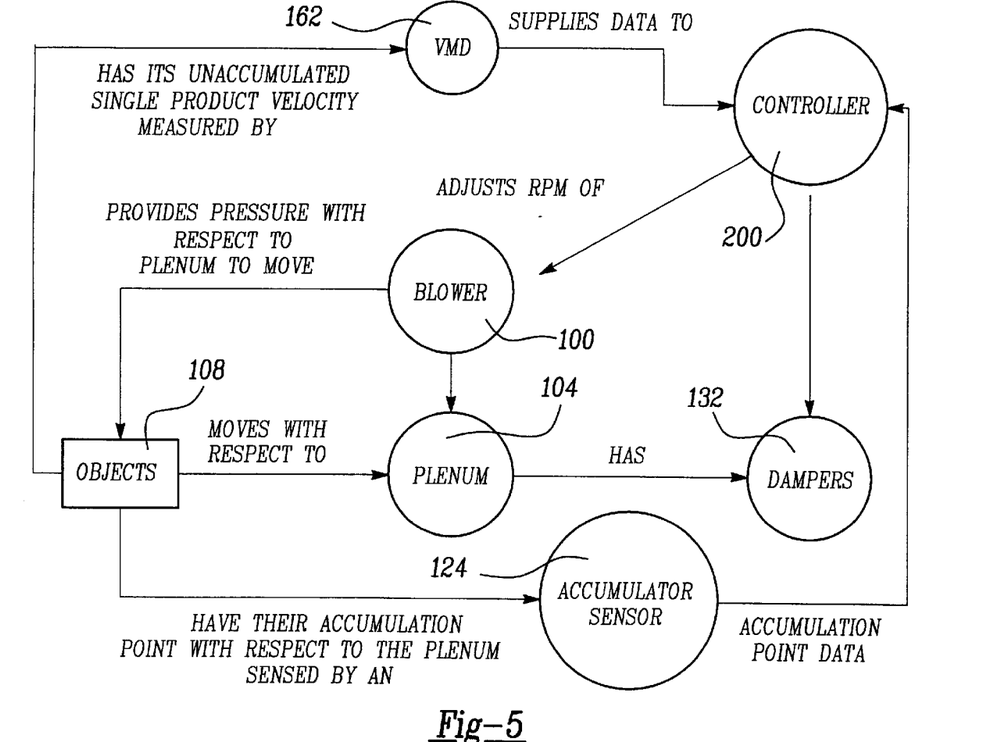
FIG. 5 is an entity relationship diagram showing the interrelationships of the damper control and the blower control systems.

FIG. 5 shows the operational interrelationship between the control of the dampers 132 and the blower 100. The objects 108 which move on the plenum 104 have their accumulation point with respect to the plenum 104 sensed by an accumulator sensor 124. A controller 200 receives the accumulation point data from the accumulator sensor 124 and controls the dampers 132 based upon the accumulation point data. Furthermore, the controller 200 adjusts the RPM of blower 100 based upon the unaccumulated single product velocity as supplied by the VMD 162.

Referring to FIG. 24 which is a sideview of the preferred embodiment of the present invention, the inlet 202 of the blower 100 for the plenum 104 is at the downstream end of the blower zone. Top cover 422 lies above can 280 which is on deck 284. FIG. 24 shows eight accumulator sensors (211, 212, 213, 214, 215, 216, 217, 218). Seven dampers correspond to the first seven accumulator sensors. The seven dampers are D1 221, D2 222, D3 223, D4 224, D5 225, D6 226, and D7 227. Also, a VMD 162 and turning vanes 240 are shown on FIG. 24. For the preferred embodiment for the arrangement shown in FIG. 24, blower 100 is a 20 horse power variable speed blower and has no outlet damper.

While FIG. 24 shows an eighty foot blower zone and a four foot wide conveyor arrangement, it is to be understood that the present invention is not limited to these dimensions nor to the number of sensors or dampers shown. Also, while FIG. 24 shows a ten foot distance between successive dampers and an eight foot distance between a sensor and its corresponding damper, it is to be understood that the present invention is not limited to these dimensional arrangements. For example, more dampers, and hence, correspondingly more sensors could be used within this blower zone or even less dampers and less sensors.

The inlet 202 at the discharge end of the blower zone allows multiple dampers in the plenum 104 to open and close, thus dividing the plenum 104 into two zones, one high pressure, and one low pressure with the dividing line between the two matching the point to which the product has accumulated. With respect to the damper and sensor arrangement of FIG. 24, the following table is used in the preferred embodiment to control the dampers based upon sensor readings of where the product has accumulated:

|  | D1 | D2 | D3 | D4 | D5 | D6 | D7 | Fan RPM |
| --- | --- | --- | --- | --- | --- | --- | --- | --- |
| S1 Covered | O | O | O | O | O | O | O | High |
| S2 Covered | C | O | O | O | O | O | O | High |
| S3 Covered | O | C | O | O | O | O | O | High |
| S4 Covered | O | O | C | O | O | O | O | High |
| S5 Covered | O | O | O | C | O | O | O | High |
| S6 Covered | O | O | O | O | C | O | O | High |
| S7 Covered | O | O | O | O | O | C | O | High |
| S8 Covered | O | O | O | O | O | O | C | High |
| S8 Uncovered | O | O | O | O | O | O | O | Low |

The letter "O" denotes that the damper is open and "C" denotes that the damper is closed.

The present invention provides for: long blower zones with short control zones with no need to split the plenum; the ability to set control zones at whatever length is required for the particular application; unidirectional turning vanes at blower to plenum connection which are correctly designed for the application for lower pressure loss; and the ability to compensate for high plenum velocities, where low pressures would normally be observed nearest the blower, by adjusting the sequencing dampers to a partially closed position when open.

Figure 6:
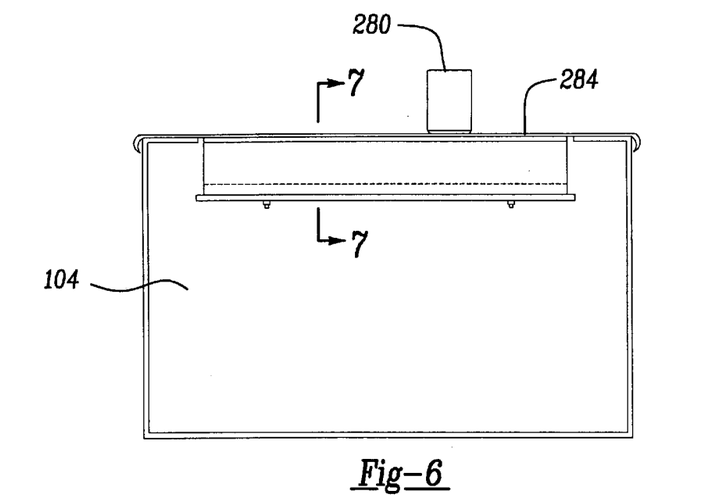
FIG. 6 is a schematic view of an air conveyor which handles cans.

FIG. 6 shows the preferred embodiment for an air conveyor system which conveys cans. Cans (for example, can 280) are conveyed upon deck 284. Plenum 104 is also shown for reference.

Figure 7:
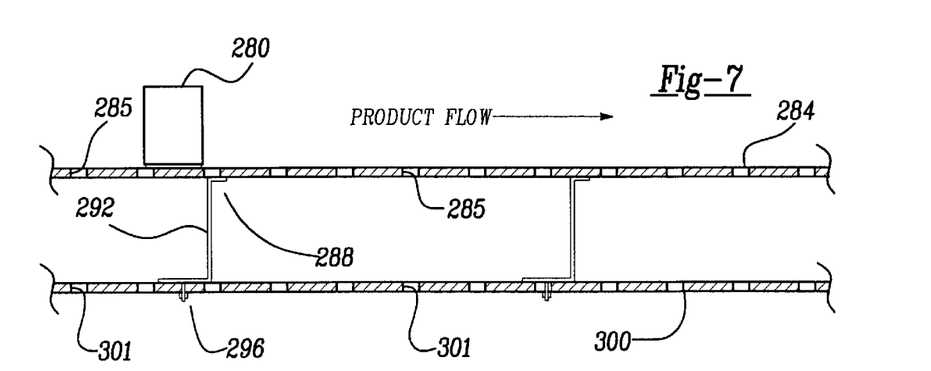
FIG. 7 is a cross-sectional view of the air conveyor of FIG. 6 taken through 7—7.

Referring to FIG. 7, can 280 is conveyed upon deck 284. At location 288, zeebar 292 is spot welded to deck 284. For the preferred embodiment, the deck 284 is a 33% perforated plate (with perforations 285). At location 296, zeebar 292 is fastened onto a sheet 300 via a stud which is "shot onto" zeebar 292 with a stud gun. Sheet 300 is perforated and provides additional structural support for deck 284.

Figure 8:
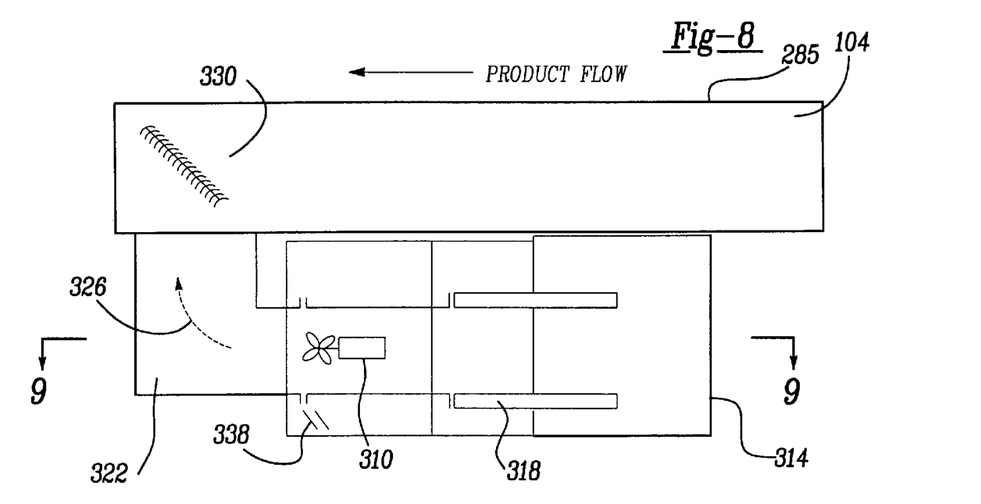
FIG. 8 is a schematic view showing the blower and plenum opening with respect to the blower.

FIG. 8 shows the blower and plenum opening arrangement for the preferred embodiment. Blower 310 is a direct drive vane axial blower. Box 314 is lined with sound absorbing material and additionally has sound absorbing material at location 318.

Elbow 322 directs the air flow 326 towards a "bolt in" turning vane assembly 330. Plenum 104 and deck 284 are also shown in FIG. 8. Moreover, the preferred embodiment uses filters 338 through which air flows into the plenum 104.

Figure 9:
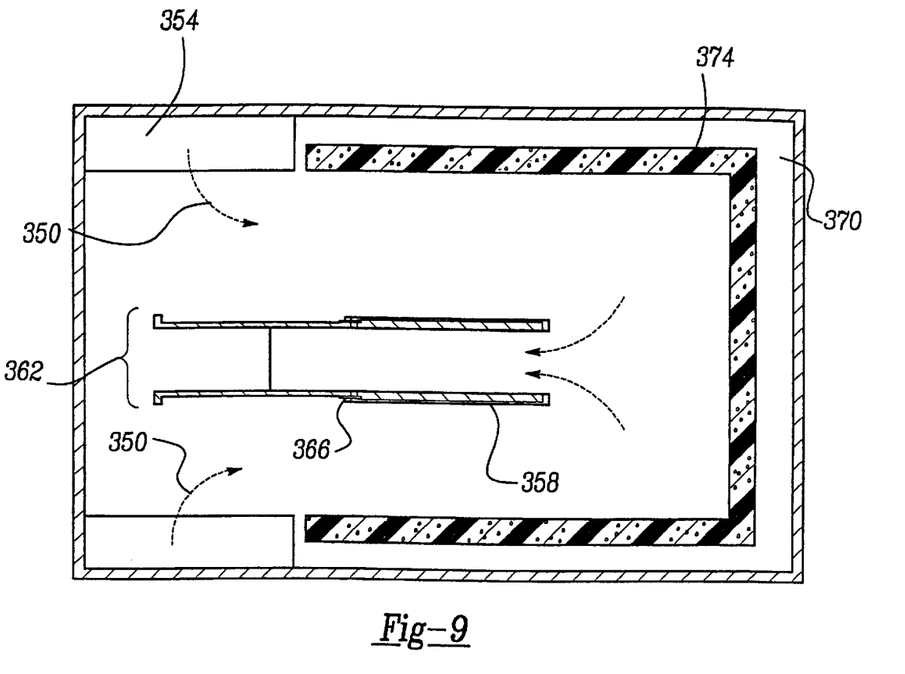
FIG. 9 is a cross-sectional view of the air conveyor system of FIG. 8 taken through 9—9.

FIG. 9 is a sideview of the present invention and it shows air flow and also how sound is abated in the preferred embodiment. Air flow 350 passes through air filter 354. A sheet metal tube 358 is bolted onto a tube-shaped blower 362 via bolt 366. Sheet metal box 370 is lined with sound absorbing foam 374.

FIG. 10 shows the configuration of a sequencing damper for the preferred embodiment. Can 280 travels upon deck 284 which is supported by zeebar 292. Deck 284 is perforated and includes louvers (not shown). Zeebar 292 is fastened upon perforated sheet 300.

A damper plate which possibly could be perforated, is shown in its closed position at location 396a. The damper, when it is partially open, is shown at location 396b. The damper is welded onto a round shaft 400. The bottom of the plenum is shown at location 404.

Figure 11:
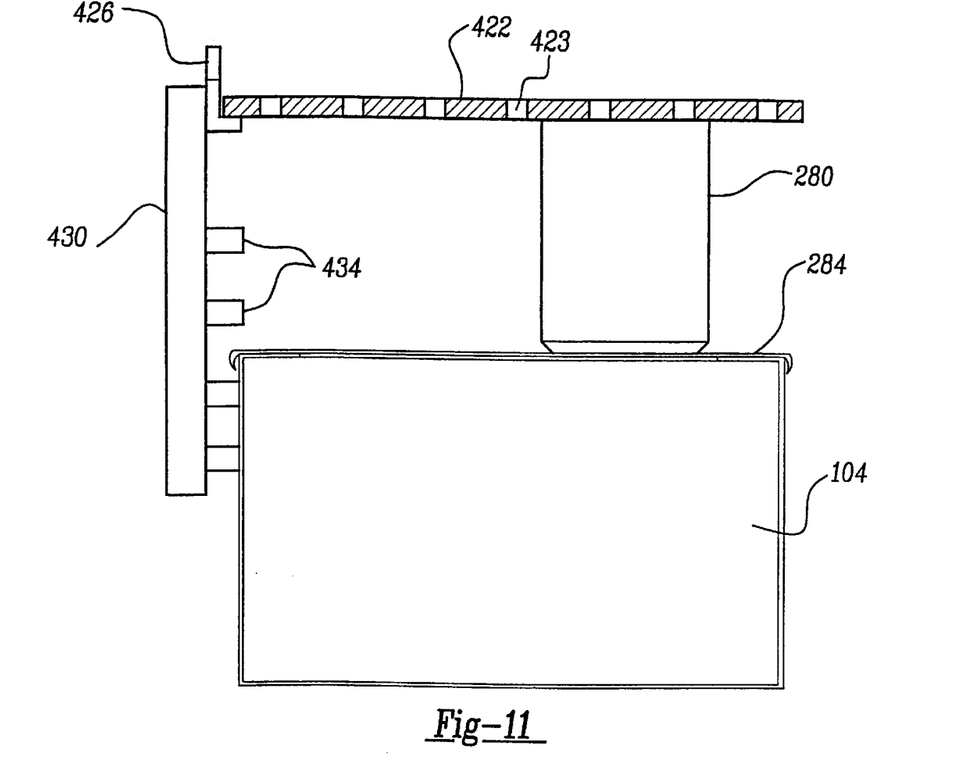
FIG. 11 is a schematic view showing the can-flow area within the air conveyor system.

FIG. 11 shows the can flow area. Can 280 is conveyed upon deck 284 which lies above plenum 104. Above the can 280 is a top cover perforated stainless sheet (top cover 422) which is supported by a top cover support angle 426. Also, the preferred embodiment includes a side rail bracket 430 and side guards 434.

Figure 12:
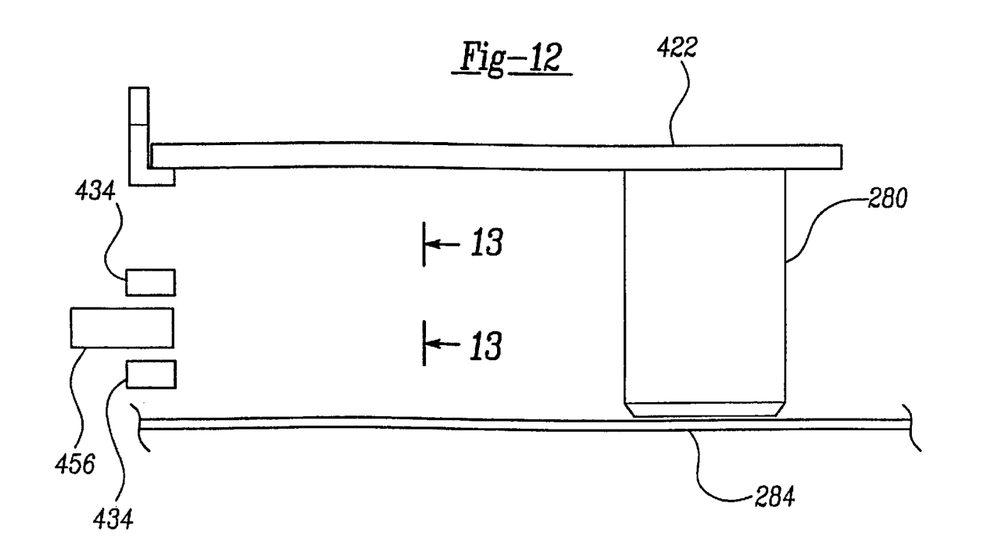
FIG. 12 is a schematic view showing the accumulation/unaccumulated measurement device within the air conveyor system.

FIG. 12 illustrates the use of the accumulation/unaccumulated measurement device for the preferred embodiment. Can 280 is conveyed upon deck 284 which lies below top cover 422. Side guards 434 are provided for can 280. For the preferred embodiment, sensor 456 is a proximity induction sensor block. Such sensors are available from Allen-Bradley.

Figure 13:
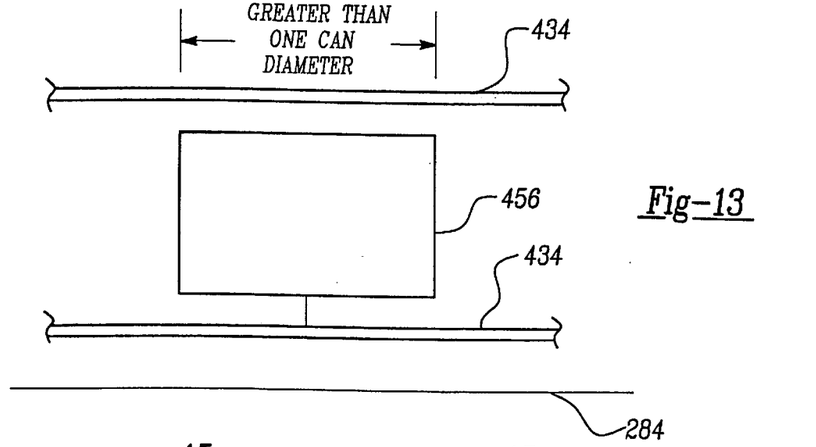
FIG. 13 is a cross-sectional view of the air conveyor system of FIG. 12 taken through 13—13.

Referring to FIG. 13, sensor 456 lies between side guards 434 and is greater than one can diameter for the preferred embodiment. For reference, deck 284 is shown.

Figure 14:
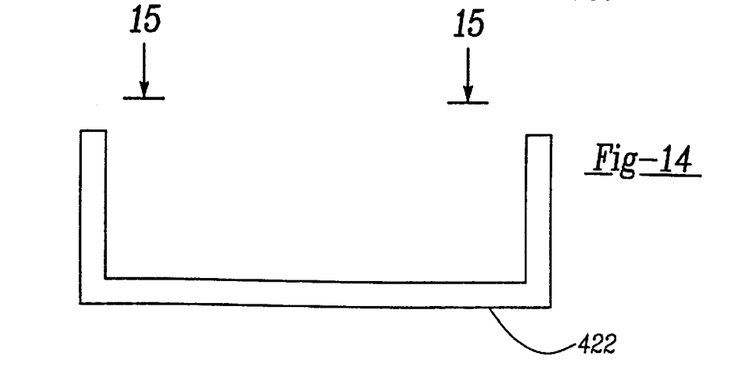
FIG. 14 is a schematic view showing the top cover for the direct measurement device of the air conveyor system.
Figure 15:
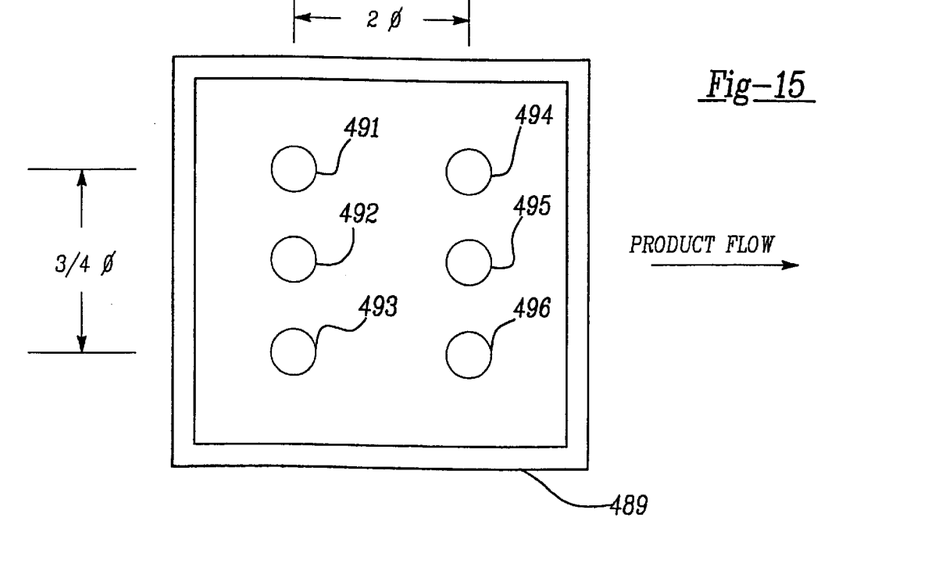
FIG. 15 is a cross-sectional view of the air conveyor system of FIG. 14 taken through 15—15.

FIGS. 14 and 15 illustrate the direct measurement aspect to the present invention. FIG. 14 shows top cover 422. Referring to FIG. 15, the preferred embodiment uses a plastic top cover insert 489. Six tube proximity sensors (491, 492, 493, 494, 495, and 496) are shown with each being for the preferred embodiment one-half the diameter of the can. The dimensional arrangement for the preferred embodiment includes having tube proximity sensor 491 being two diameters of the can away from tube proximity sensor 494 and being three quarters of the diameter of the can away from tube proximity sensor 493.

If tube proximity sensor 492 is broken (i.e., activated) before tube proximity sensors 491 and 493, and tube proximity sensor 495 is broken before tube proximity sensors 494 and 496, and tube proximity sensor 492 is not broken by another can before tube proximity 495 is broken, then a measurement is taken.

Figure 16:
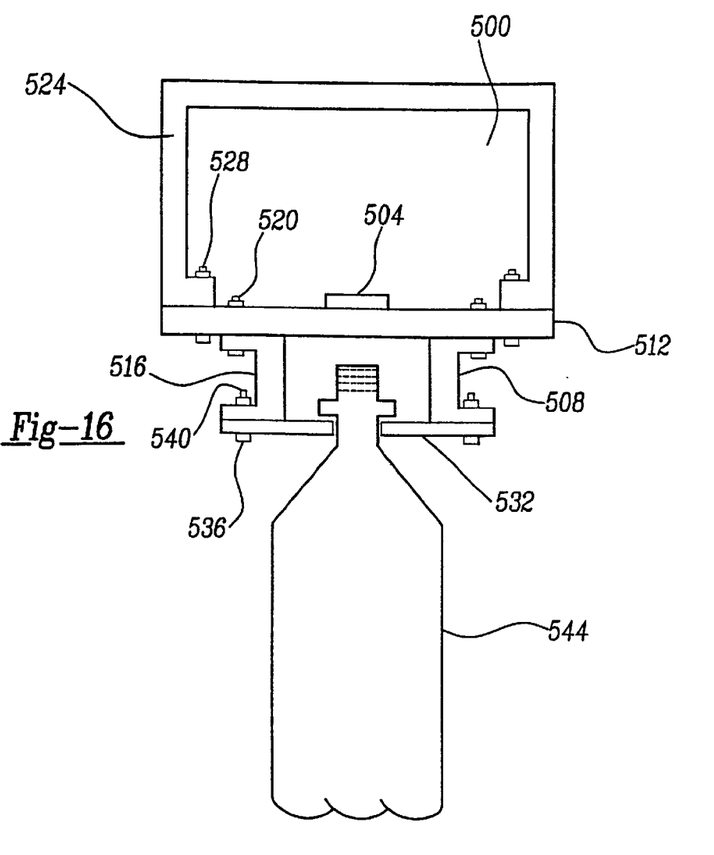
FIG. 16 is a schematic view showing the plenum of the air conveyor system for handling plastic bottles.

FIG. 16 illustrates the preferred embodiment for an air conveyor system which conveys plastic bottles, such as PET bottles. A plenum is shown at location 500. A drive slot 504 is used within the preferred embodiment to direct air toward the open end of the bottle. An aluminum channel 508 is fastened to deck 512 via a through bolt 516 and weld nut 520. Deck 512 is fastened to the structure 524 which forms the plenum 500 via a sheet metal screw 528. For the preferred embodiment, the aluminum channel is 1.5 inches by 1.5 inches and is fastened to a neck guide 532 via a through bolt 536 and weld nut 540. The neck guide 532 for the preferred embodiment is made of stainless steel and is used to guide bottle 544.

Figure 17:
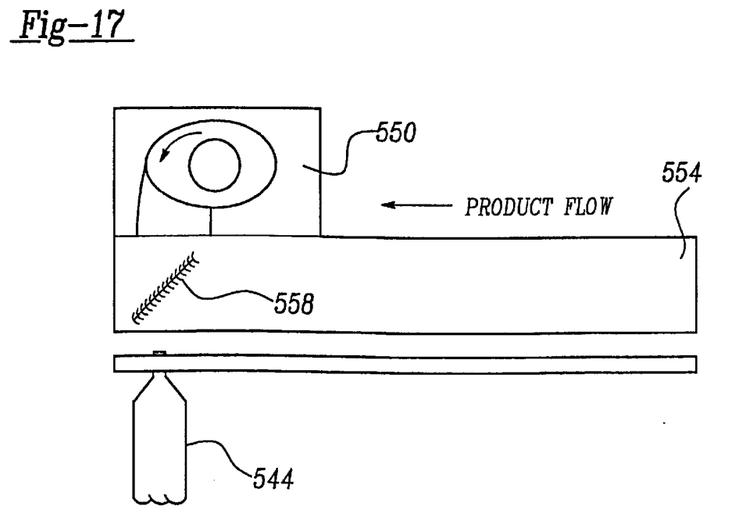
FIG. 17 is a schematic view of the bottle air conveyor system showing the blower and plenum opening.

FIG. 17 shows the preferred embodiment for the blower and plenum opening for an air conveyor system which conveys plastic bottles. Blower 550 is mounted directly to plenum 554 in the preferred embodiment and includes a blower direct drive (e.g., a 3.5 or 12.25 inch Chicago SQAD). Within plenum 554 are "bolt on" turning vanes 558 which direct air flow to transport bottle 544.

Figure 18:
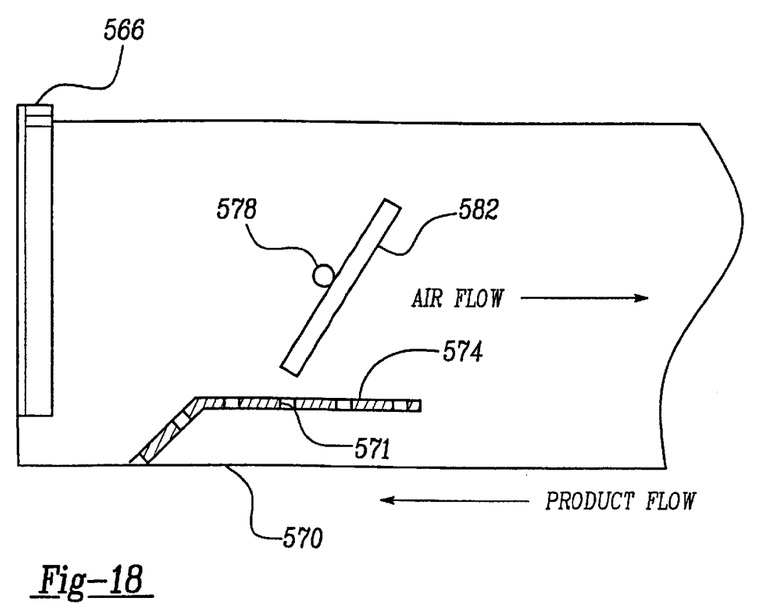
FIG. 18 is a schematic view showing the sequencing damper for the bottle air conveyor system.

FIG. 18 shows the configuration for the preferred embodiment for a sequencing damper for a bottle air conveyor system. A plenum flange 566 is used in the preferred embodiment to attach adjacent conveyor sections. Upon deck 570 is a deck diffuser perforated plate 574 (with perforlitions 571). Upon a round shaft 578 is welded a damper 582.

Figure 19:
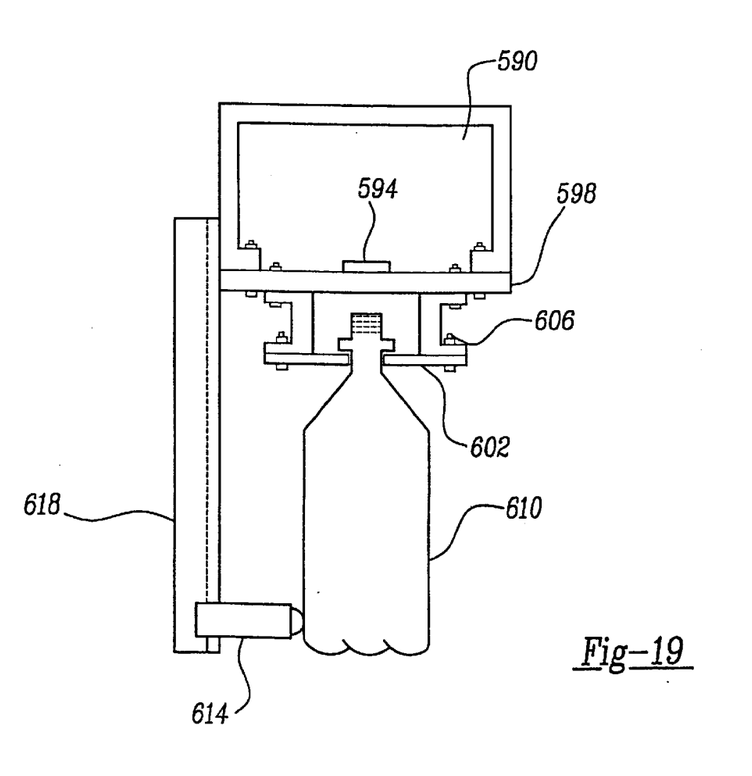
FIG. 19 is a schematic view showing the bottle flow area for the bottle air conveyor system.

FIG. 19 shows the configuration for the bottle flow area. Plenum 590 and drive slot 594 lie above deck 598. The neck guide 602 is connected to deck 598 through channel 606. The neck guide 602 guides bottle 610. Also, side guard 614 guides bottle 610 and is connected to side rail bracket 618.

Figure 20:
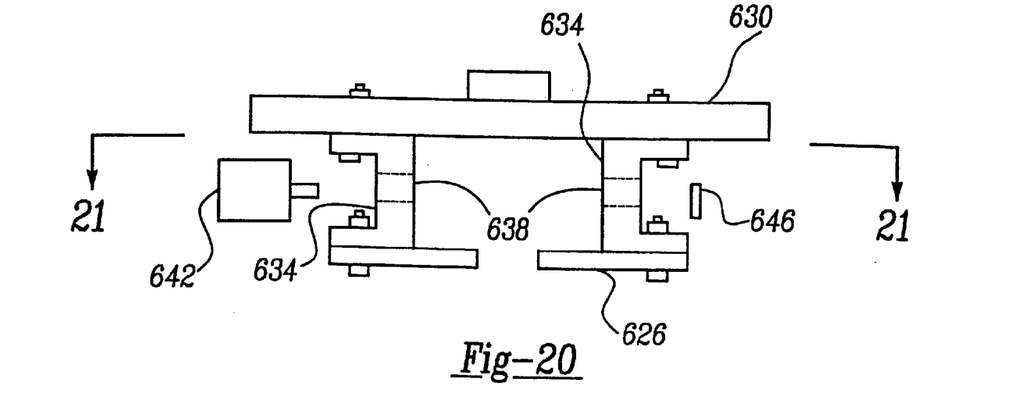
FIG. 20 is a schematic view showing the accumulation/unaccumulated measurement device for the bottle air conveyor system.
Figure 21:
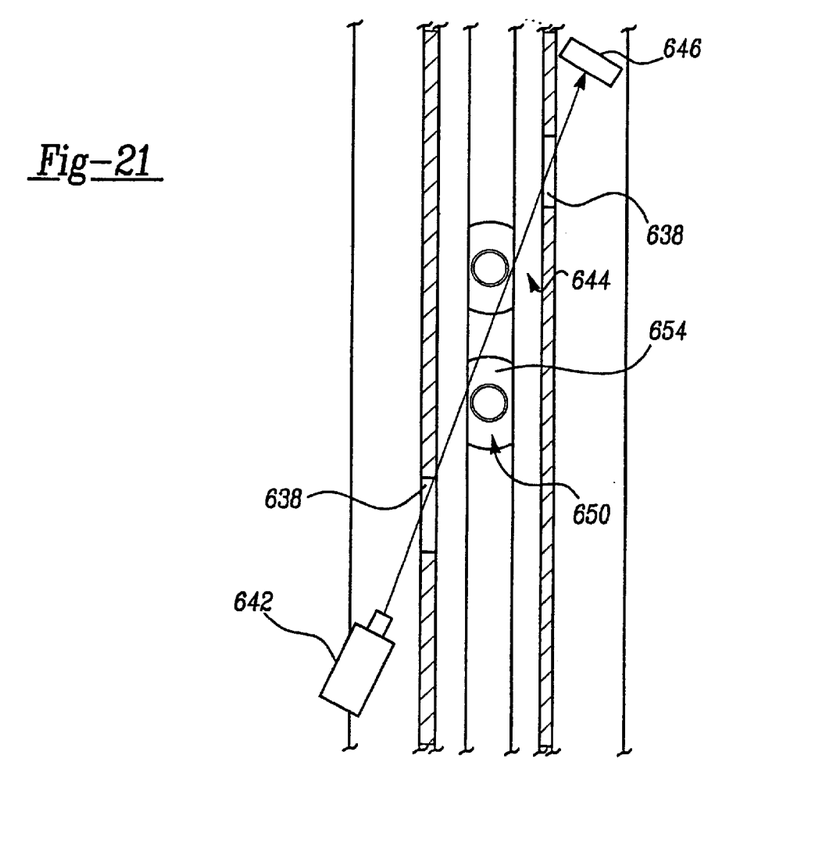
FIG. 21 is a cross-sectional view of the bottle air conveyor system of FIG. 20 taken through 21—21.

FIG. 20 shows the preferred embodiment for performing the accumulation/unaccumulated measurements. Neck guide 626 is connected to deck 630 via channel 634. Channel 634 has an opening as indicated at location 638. The openings at location 638 allow a photoeye sensor 642 to be able to have a line of sight with respect to reflector 646. The photoeye sensor 642 is available from such companies as Allen-Bradley. Referring to FIG. 21, photoeye sensor 642 shines a beam 644 upon reflector 646. The photoeye sensor 642 detects the threaded portion 650 of bottle 654 via beam 644.

Figure 22:
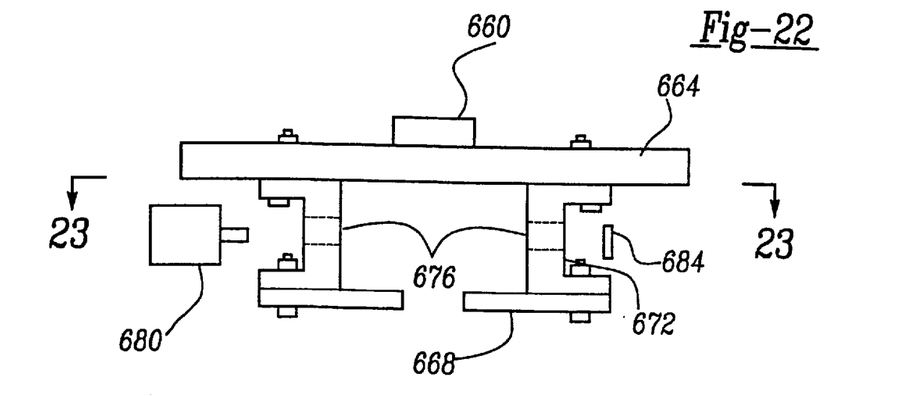
FIG. 22 is a schematic view showing the direct measurement device for the bottle air conveyor system.

FIG. 22 shows the preferred embodiment with respect to the direct measurement device. Drive slot 660 is situated above deck 664. Neck guide 668 is connected to deck 664 via channel 672. Channel 672 has an opening as indicated at location 676. A photoeye sensor 680 is able to shine a beam to reflector 684 with this type of arrangement. Photoeye sensor 680 is available from such companies as Allen-Bradley.

Figure 23:
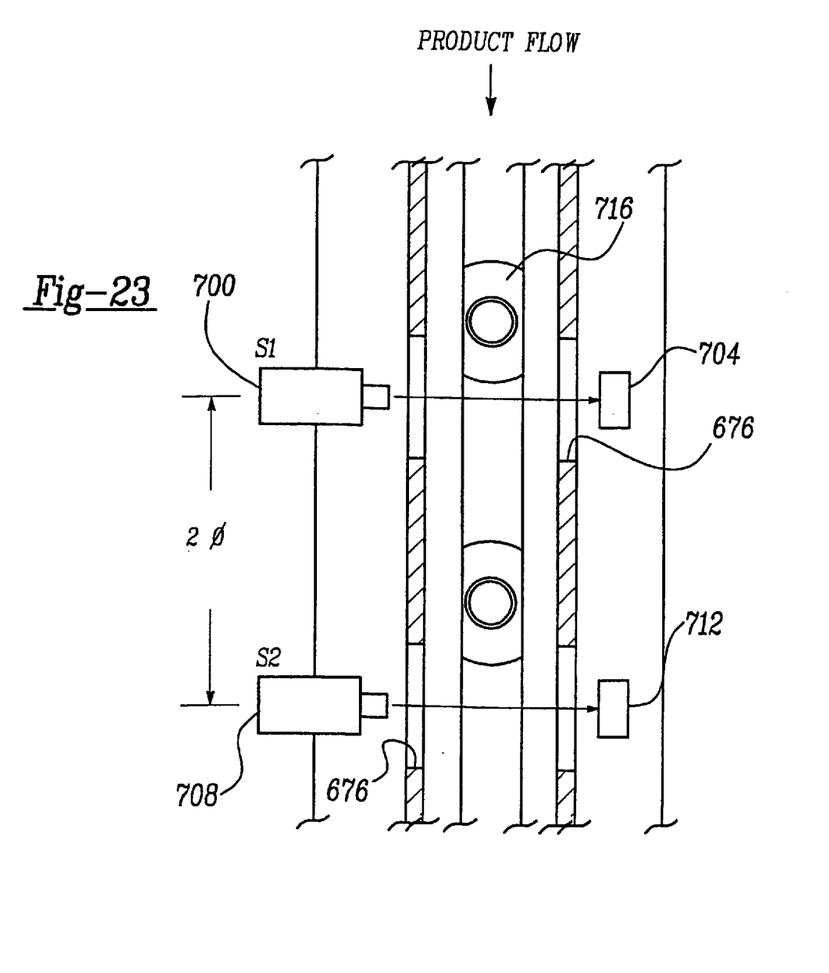
FIG. 23 is a cross-sectional view of the bottle air conveyor system of FIG. 22 taken through 23—23.

Referring to FIG. 23, a first sensor 700 shines a beam upon a first reflector 704. At a distance of two diameters of bottle 716 away from the first sensor 700 is positioned a second sensor 708 in the preferred embodiment. Second sensor 708 shines a beam upon a second reflector 712. If the light beam from the second sensor 708 is broken before the light beam from the first sensor 700 is broken for a second time, then the measurement is taken for calculating the velocity of the product flow.

The embodiment which has been set forth above was for the purpose of illustration and was not intended to limit the invention. It will be appreciated by those skilled in the art that various changes and modifications may be made to the embodiment described in this specification without departing from the spirit and scope of the invention as defined by the appended claims.

It is claimed:

1. An air conveyor system for moving objects comprising:
a plenum, and a blower for providing air to said plenum;
a plurality of dampers disposed at predetermined locations along said plenum;
a sensor device for sensing a location where the objects have accumulated with respect to said plenum, wherein at least one of said dampers is located at the location where the objects have accumulated; and
a closing device for closing the damper which is at the location where the objects have accumulated with respect to said plenum, said closing being based upon said sensed accumulated location.

2. The air conveyor system of claim 1 wherein said plenum has an upstream end and a downstream end, said air conveyor system having a blower in communication with said plenum, said upstream end being where said objects are introduced with respect to said plenum, said blower having an inlet disposed at the downstream end of said plenum.

3. The air conveyor system of claim 1 wherein said air conveyor system has a blower in communication with said plenum, said location is at a location where the objects have accumulated farthest from said blower.

4. The air conveyor system of claim 1 wherein said sensor device has a sensor located at each of said dampers for sensing whether the objects have accumulated to a respective said damper thereof.

5. The air conveyor system of claim 1 wherein said closing of said damper which is at the location where the objects have accumulated constitutes a partial closing of said damper.

6. The air conveyor system of claim 1 comprising a blower in communication with said plenum, wherein said blower is a variable speed blower, said air conveyor system further comprising:
a velocity measuring device for measuring a velocity of said objects, said objects being either in an accumulated or unaccumulated state with respect to said plenum; and
an adjustment device connected to said velocity measuring device for adjusting speed of said blower to a predetermined speed based upon the velocity of said unaccumulated objects.

7. The air conveyor system of claim 1 where only one of said dampers is partially closed at any one time.

8. A method for moving objects with an air conveyor system comprising:
providing a plurality of dampers disposed at predetermined locations along said plenum;
sensing a location where the objects have accumulated with respect to said plenum, wherein at least one of said dampers is located at the location where the objects have accumulated; and
closing the damper which is at the location where the objects have accumulated with respect to said plenum, said closing being based upon said sensed accumulated location.

9. The method of claim 8 wherein said plenum has an upstream end and a downstream end, said air conveyor system having a blower in communication with said plenum, said upstream end being where said objects are introduced with respect to said plenum, said blower having an inlet disposed at the downstream end of said plenum.

10. The method of claim 8 wherein said air conveyor system has a blower in communication with said plenum for providing said blowing air, said location is at a location where the objects have accumulated farthest from said blower.

11. The method of claim 8 further comprising the step of:
providing a sensor located at each of said dampers for sensing whether the objects have accumulated to a respective said damper thereof.

12. The method of claim 8 further comprising the step of:
partially closing said damper which is at the location where the objects have accumulated.

13. The method of claim 8, wherein a blower is in communication with said plenum, said blower is a variable speed blower, said method further comprising the steps of:
measuring a velocity of said objects, said objects being either in an accumulated or unaccumulated state with respect to said plenum; and
adjusting speed of said blower to a predetermined speed based upon the velocity of said unaccumulated objects.

14. The method of claim 8 further comprising the step of:
partially closing only one of said dampers at any one time.

* * * * *